United States Patent [19]

Osanai et al.

[11] Patent Number: 4,649,485
[45] Date of Patent: Mar. 10, 1987

[54] APPARATUS FOR CONTROLLING CONTINUOUSLY VARIABLE TRANSMISSION

[75] Inventors: Akinori Osanai; Takao Niwa; Takeshi Gono, all of Susono, Japan

[73] Assignee: Toyota Jidosha Kabushiki Kaisha, Toyota, Japan

[21] Appl. No.: 629,466

[22] Filed: Jul. 10, 1984

[30] Foreign Application Priority Data

Aug. 22, 1983 [JP] Japan ................................. 58-151731

[51] Int. Cl.⁴ .............................................. F16H 9/18
[52] U.S. Cl. .................................. 364/424.1; 74/866; 474/12
[58] Field of Search ............... 364/424.1; 74/859, 860, 74/862, 858, 866; 474/11, 12, 18, 28

[56] References Cited

U.S. PATENT DOCUMENTS

| | | | |
|---|---|---|---|
| 4,161,894 | 7/1979 | Giacosa | 474/12 |
| 4,291,594 | 9/1981 | Baudoin | 74/877 X |
| 4,342,298 | 8/1982 | Ganoung | 74/877 X |
| 4,383,456 | 5/1983 | Ganoung | 74/877 X |
| 4,458,318 | 7/1984 | Smit et al. | 74/866 |
| 4,458,560 | 7/1984 | Frank et al. | 74/877 X |
| 4,459,878 | 7/1984 | Frank | 74/866 |
| 4,481,844 | 11/1984 | Ironside et al. | 74/866 |
| 4,507,986 | 4/1985 | Okamura et al. | 74/859 |
| 4,515,040 | 5/1985 | Takeuchi et al. | 74/866 |
| 4,515,041 | 5/1985 | Frank et al. | 74/866 |
| 4,536,171 | 8/1985 | Tanaka et al. | 74/866 |
| 4,546,673 | 10/1985 | Shigematsu et al. | 74/866 |

FOREIGN PATENT DOCUMENTS 0090450 6/1982 Japan ................................. 474/11

Primary Examiner—P. S. Lall
Attorney, Agent, or Firm—Oblon, Fisher, Spivak, McClelland & Maier

[57] ABSTRACT

A continuously variable transmission (CVT) is controlled such that an actual engine speed Ne is equalized to a desired engine speed Ne'. Defining Nc as a positive constant, the speed ratio e of the CVT is substantially fixed during a period of time when the Ne changes from $Ne < Ne' - Nc$ to $Ne' - Nc \leq Ne < Ne'$ and then changes to $Ne \geq Ne'$. $Ne' - Nc$ is defined as a temporarily desired engine speed during a period of time when the Ne changes from $Ne \geq Ne'$ to $Ne' - Nc \leq Ne < Ne'$ and then changes to $Ne < Ne' - Nc$. During the period of time the speed ratio of the CVT is changed such that the actual engine speed Ne is equalized to the temporarily desired engine speed $Ne' - Nc$.

8 Claims, 8 Drawing Figures

4,649,485

APPARATUS FOR CONTROLLING CONTINUOUSLY VARIABLE TRANSMISSION

BACKGROUND OF THE INVENTION

1. Field of the Invention

The present invention relates to an apparatus for controlling a continuously variable transmission (CVT) used in a vehicle.

2. Description of the Prior Art

A CVT capable of continuously controlling a speed ratio e (=output side rotational speed/input side rotational speed) is used in a vehicle for a power transmission unit with excellent specific fuel consumption. A desired engine speed Ne' is set as an engine speed to achieve an output horse power of the engine set as a function of a pedalling amount of an accelerator pedal for example with a minimum fuel consumption, and the CVT is controlled such that an actual engine speed Ne is equalized to the desired engine speed Ne'. In the prior method of controlling the CVT, the speed change of the CVT, i.e. the alteration in the speed ratio e is always effected when there is some deviation between Ne and Ne', while the transmission loss of the CVT during the speed change is so large drive torque is disadvantageously transmitted. Thus, when the vehicle is accelerated, the acceleration performance may be improved and advantages may be provided in the specific fuel consumption by elongating a period of time when the engine speed Ne having small transmission loss of the CVT is low to increase the drive torque rather than by increasing rapidly the engine speed Ne to the desired engine speed Ne' through the speed change of the CVT.

SUMMARY OF THE INVENTION

An object of the present invention is to provide an apparatus for controlling a continuously variable transmission (CVT) which is advantageous both in a specific fuel consumption and acceleration performance.

According to the present invention to achieve this object, in the apparatus for controlling the CVT such that an actual engine speed Ne is equalized to a desired engine speed Ne', the speed change of the CVT is controlled such that when (a) the Nc is defined as a positive constant, (b) Ne becomes $Ne<Ne'-Nc$ and then $Ne'-Nc \leq Ne<Ne'$, the speed ratio e of the CVT is fixed or or almost fixed until Ne becomes $Ne \geq -Ne'$ and (c) when Ne becomes $Ne \geq Ne'$ and then $Ne'-Nc \leq Ne<Ne'$, $Ne'-Nc$ is set to a temporary desired engine speed Net' until Ne becomes $Ne<Ne'-Nc$ to achieve Ne=Net'.

As a result, in acceleration, a period of time when the speed ratio e is approximately fixed and that when the speed change of the CVT is performed appear alternatively and a fixed value of the speed ratio e increases stepwise to ensure a satisfactory acceleration performance while the fixing time of the speed ratio e in the acceleration increases to restrain the transmission loss of the CVT and improve the specific fuel consumption.

Also in the acceleration, the speed ratio e may be approximately fixed (slight speed change) instead of being fixed. In a short, the speed change may be controlled only in high transmission efficiency. In this case Ne'>Ne is to be provided without the acceleration (vehicle speed increase) in $Net'<Ne<Ne'$.

In a preferred embodiment, to judge whichever Ne becomes $Ne'-Nc \leq Ne<Ne'$ from $Ne<Ne'-Nc$ or $Ne \leq -Ne'$, a flag Fn is set if $Ne \geq -Ne'$ and reset if $Ne<Ne'-Nc$. Thus, when $Ne'Nc \leq -Ne<Ne'$ and Fn=0, the speed ratio e is approximately fixed, and when $Ne'-Nc \leq Ne<Ne'$ and Fn=1, $Ne'-Nc$ is set to a temporary desired engine speed Net' and the speed change of the CVT is controlled so as to provide Ne=Net'.

Nc is used as a factor for judging whether the acceleration performance is improved rather by fixing the speed ratio e or the necessary and sufficient acceleration performance is obtained even from fixing the speed ratio e. However, since such Nc varies with the running condition of an engine and a vehicle, it is preferable that Nc is a function of a vehicle speed V and a throttle position $\theta$.

The accompanying drawings, which are incorporated in and constitute part of this specification, illustrate embodiments of the present invention and, together with the description, serve to explain the principle of the present invention.

DETAILED DESCRIPTION OF PREFERRED EMBODIMENTS

Figure 1:
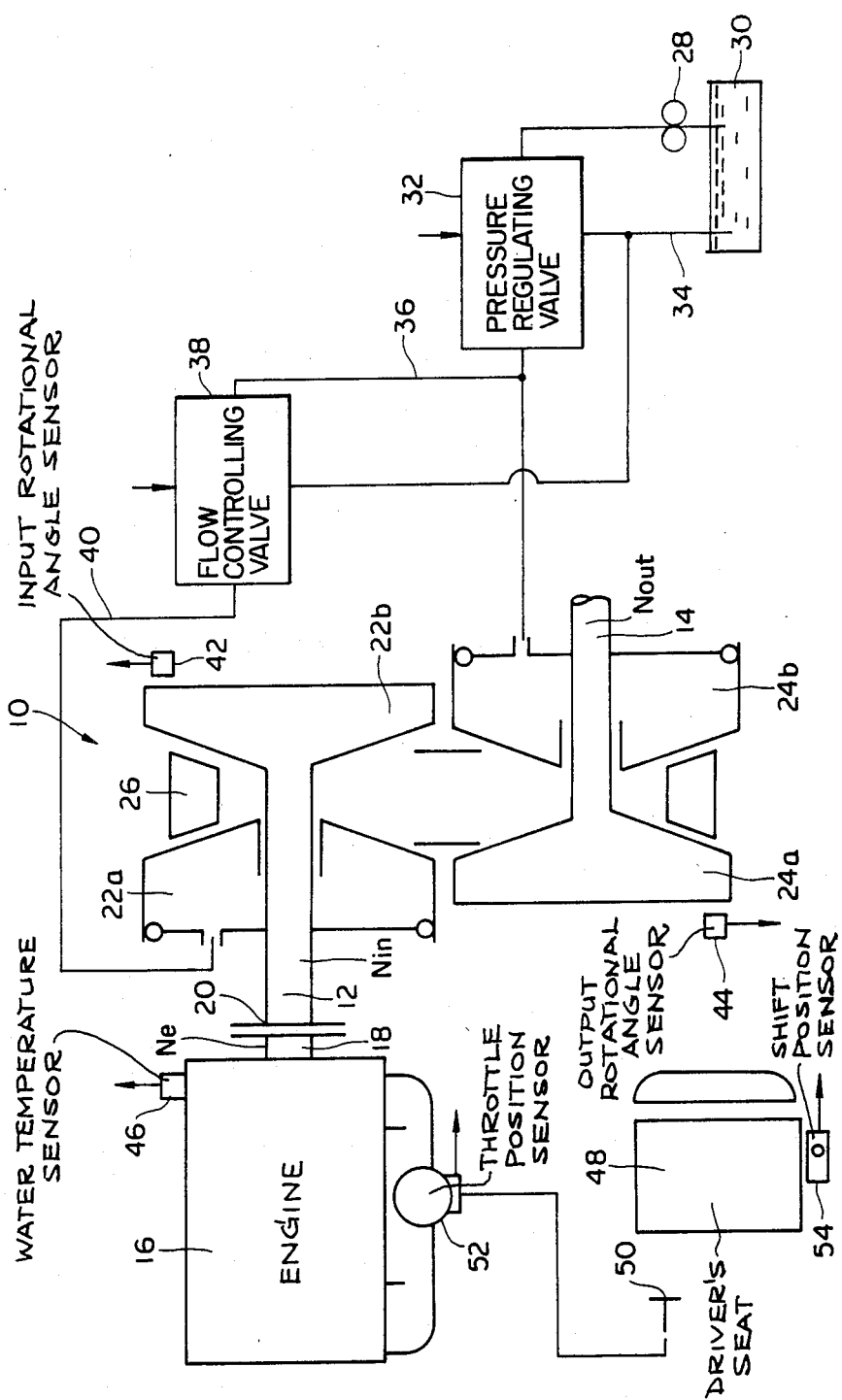
FIG. 1 is a schematic view showing a whole CVT to which the present invention is applied.

In FIG. 1, a CVT 10 is provided an input shaft 12 and an output shaft 14 parallel to each other. The input shaft 12 is provided coaxially with a crankshaft 18 of an engine 16 and connected to the crankshaft 18 through a clutch 20. Input side pulleys 22a, 22b are provided opposed to each other, one input side pulley 22a being provided on the input shaft 12 to be moved axially as a movable pulley and fixed rotationally and the other input side pulley 22b being fixed to the input shaft 12 as a fixed pulley. Similarly, output side pulleys 24a, 24b are provided opposed to each other one output side pulley 24a being fixed to the output shaft 14 as a fixed pulley and the other output side pulley 24b being provided on the output shaft 14 to be moved axially as a movable pulley and fixed rotationally. The opposed surfaces of the input and output side pulleys 22a, 22b and 24a, 24b are formed tapered and a belt 26 having an equilateral trapezoidal section is trained over the input and output side pulleys 22a, 22b and 24a, 24b. An oil pump 28 sends oil in an oil reservoir 30 to a pressure regulating valve 32. The pressure regulating valve 32 controls line pressure in an oil path 36 by varing the escaping amount of oil to a drain 34 and the line pressure in the oil path 36 is sent to a hydraulic cylinder and a flow controlling valve 38 of the output side pulley 24b. The flow controlling valve 38 controls oil flow supplied from the oil path 36 to an oil path 40 connected to the hydraulic cylinder of the input side disk 22a and oil flow drained from the oil path 40 to the drain 34. Press forces of the input and output side pulleys 22a, 22b and 24a, 24b against the belt 26 is controlled by oil pressure in the input and output side hydraulic cylinders and the engaging radii of the belt 26 on the tapered surfaces of the input and output side pulleys 22a, 22b and 24a, 24b are varied in relation to the press forces to vary thereby the speed ratio e of the CVT 10 (=Nout/Nin, where Nout is the rotational speed of the output shaft 14 and Nin is the rotational speed of the input shaft 12. In this embodiment, Nin=engine speed Ne.).

The line pressure in the output side hydraulic cylinder is controlled to the necessary minimum value to avoid the slip of the belt 26 and ensure the power transmission for restraining the drive loss of the oil pump 28 so that the speed ratio e is controlled by oil pressure in the input side hydraulic cylinder. Further, while the oil pressure in the input side hydraulic cylinder $\leq$ the oil pressure in the output side hydraulic cylinder, since the pressure receiving area of the input side hydraulic cylinder > the pressure receiving area of the output side hydraulic cylinder, the press forces of the input side pulleys 22a, 22b, are to be larger than that of the output side pulleys 24a, 24b. Input and output rotational angle sensors 42 and 44 detect respectively the rotational speeds Nin, Nout of the input and output shafts 12, 14 and a water temperature sensor 46 detects temperature of cooling water in the engine 16. An accelerator pedal 50 is provided in a driver's seat 48 to be interlocked with a throttle valve in an intake path, and a throttle position sensor 52 detects the throttle position $\theta$. A shift position sensor 54 detects the shift range of a shift lever near the driver's seat.

Figure 2:
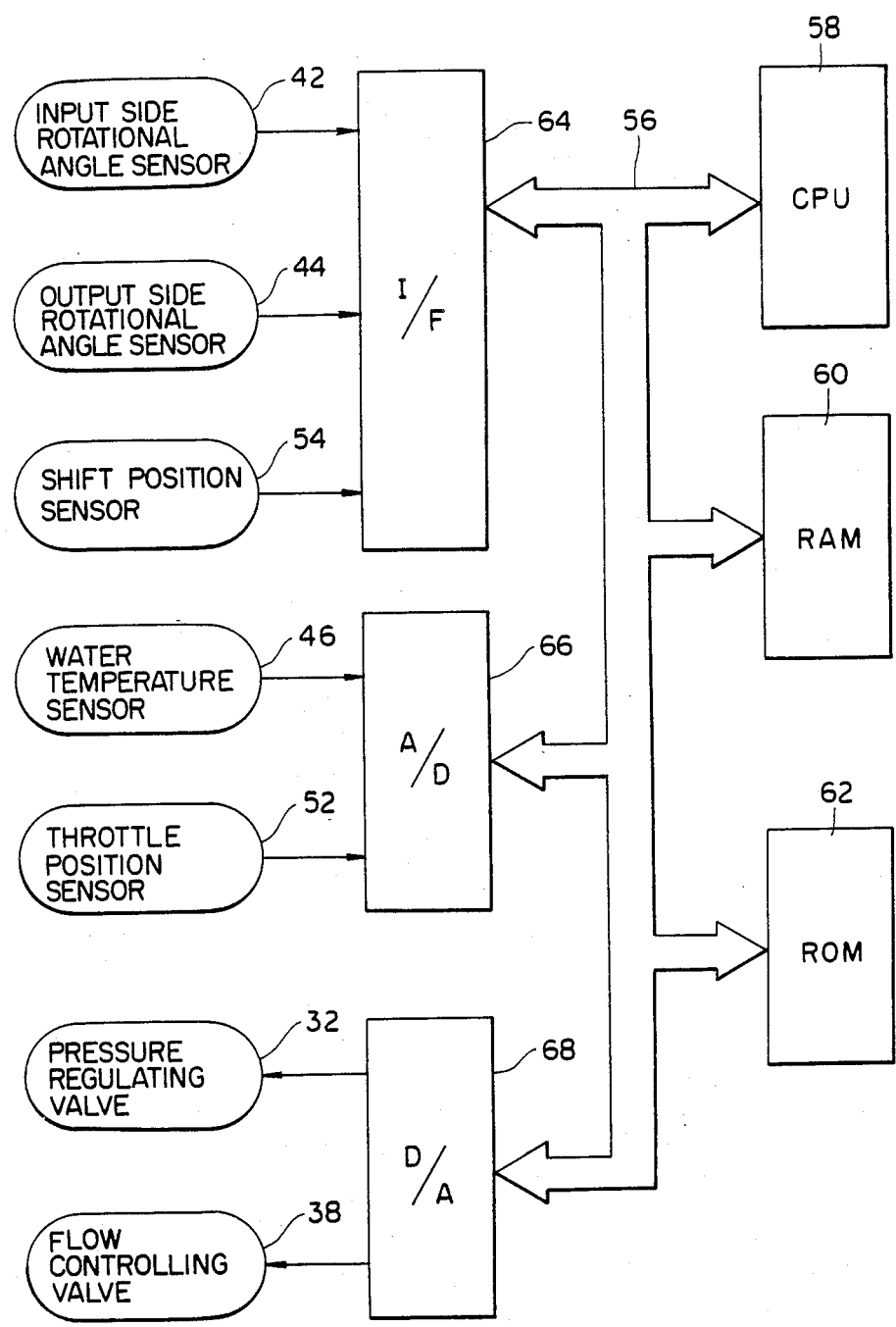
FIG. 2 is a block diagram showing an electronic control unit.

FIG. 2 is a block diagram showing an electronic control unit. CPU 58, RAM 60, ROM 62, I/F (interface) 64, A/D (analog/digital converter) 66 and D/A (digital/analog converter) 68 are interconnected with each other by an address data bus 56. The I/F 64 receives pulse signals from the input side rotational angle sensor 42, the output side rotational angle sensor 44 and the shift position sensor 54, the A/D 66 receives analog signals from the water temperature sensor 46 and the throttle position sensor 52 and the D/A 68 generates output pulses to the pressure regulating valve 32 and the flow controlling valve 38.

Figure 3:
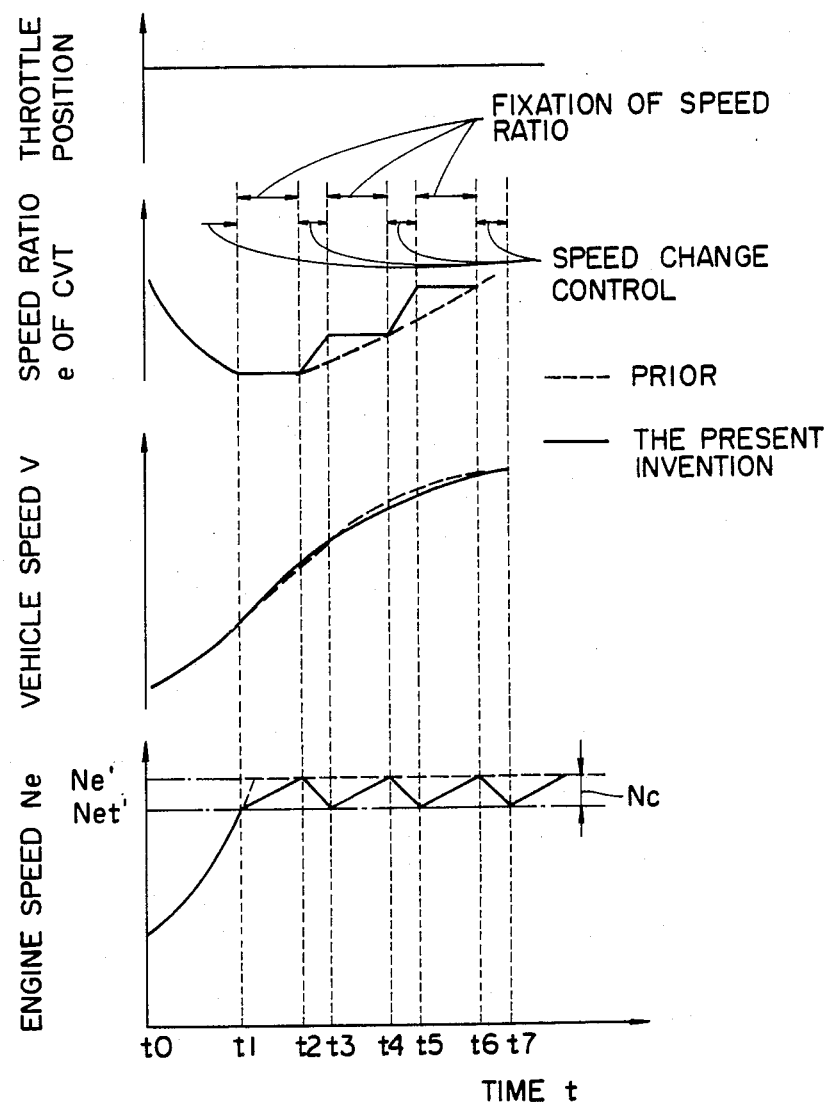
FIG. 3 is a view for explaining the technical concept of the present invention.
Figure 4:
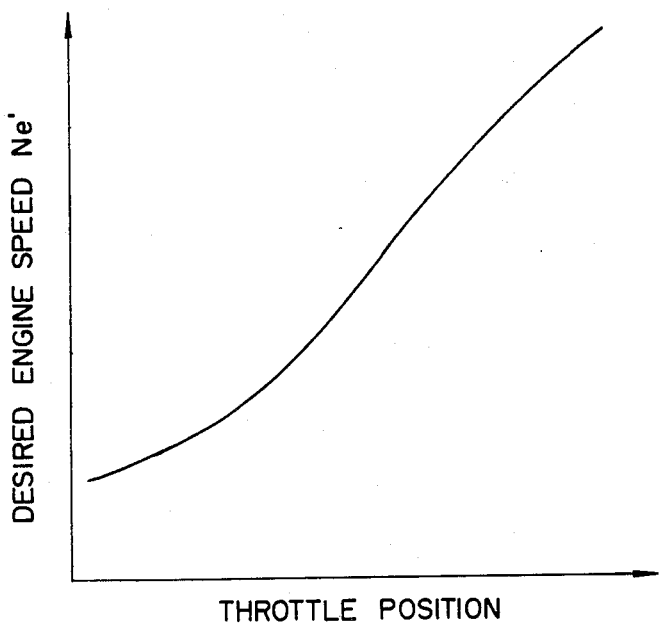
FIG. 4 is a graph showing the relationship between a throttle position and a desired engine speed.

FIG. 3 is a view for explaining the technical concept of the present invention. The desired engine speed Ne' is set as a function of the throttle position $\theta$ (FIG. 4) and the speed change of the CVT 10 is carried out except for during a specific period such that the actual engine speed Ne is equalized to Ne'. When the accelerator pedal 50 is pedalled at time t0 to increase the throttle position $\theta$ by a predetermined amount, the engine speed Ne rapidly increases toward the desired engine speed Ne' through the speed change of the CVT 10. When the engine speed Ne reaches a value Net'(=Ne'−NC) which is a positive constant Nc smaller than the desired engine speed Ne' at time t1, the speed ratio e is fixed to the prevailing value at time t1. During the period from t1 to t2, the speed ratio e may be changed very slowly or completely fixed as in the embodiment of FIG. 3. It is possible to obtain a transmission efficiency of nearly 100% in the CVT in spite of the change in the speed ratio e if the change is very slow. In this case, Ne is to be equalized to Ne' with the passage of time even if acceleration is not carried out in Net'<Ne<Ne'. Since the engine 16 generates the engine power corresponding to the throttle position $\theta$, the engine speed Ne increases with the increase of the engine power on and after time t1. At time t2 when a condition of Ne$\geq$Ne' is produced the desired engine speed is changed from Ne' to Ne'−Nc, i.e. Net'. At the same time the fixing of the speed ratio ends and the speed change of the CVT 10 is controlled. Thus, the speed ratio e is increased while the engine speed Ne rapidly decreases toward Net' on and after time t2. When Ne<Ne'−Nc is obtained in time t3, the speed ratio e is again fixed while the desired engine speed is returned to Ne'. Until the vehicle speed V thus reaches a normal value, the period when the speed ratio e is fixed and the period when the speed change is controlled are alternatively repeated. The transmission loss of the CVT 10 is to be restrained to prevent the drive torque from degradation by providing the period in which the speed ratio e is fixed in the acceleration of the vehicle, while the engine speed Ne is to be set to a value lower than that in the prior art wherein the speed change is continuously controlled in the acceleration. Accordingly, the specific fuel consumption is to be improved and the satisfactory or necessary and sufficient acceleration performance is to be obtained.

Figure 5:
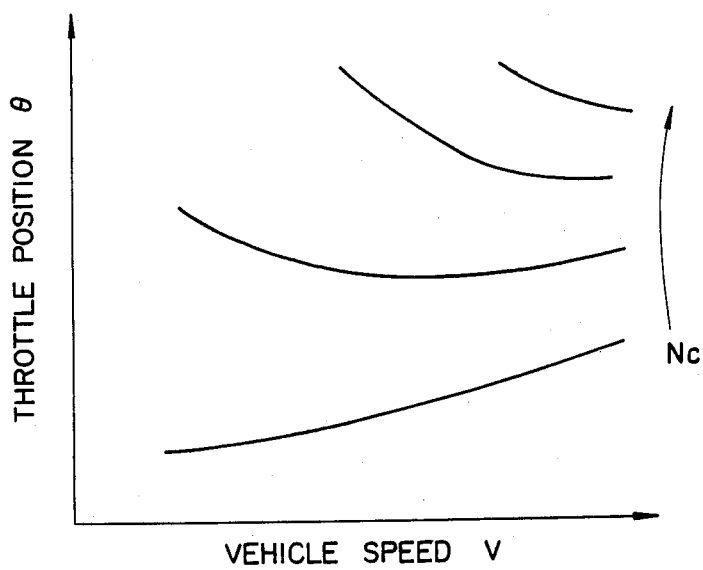
FIG. 5 is a graph showing the relationship between a vehicle speed, the throttle position and a constant.

FIG. 5 shows the relationship between the vehicle speed V, the throttle position $\theta$ and the predetermined constant value Nc. Whether or not any troubles are caused in the acceleration performance even by fixing the speed ratio e is determined by the running condition of the engine and the vehicle and Nc is set as a function of V and $\theta$.

Figure 6:
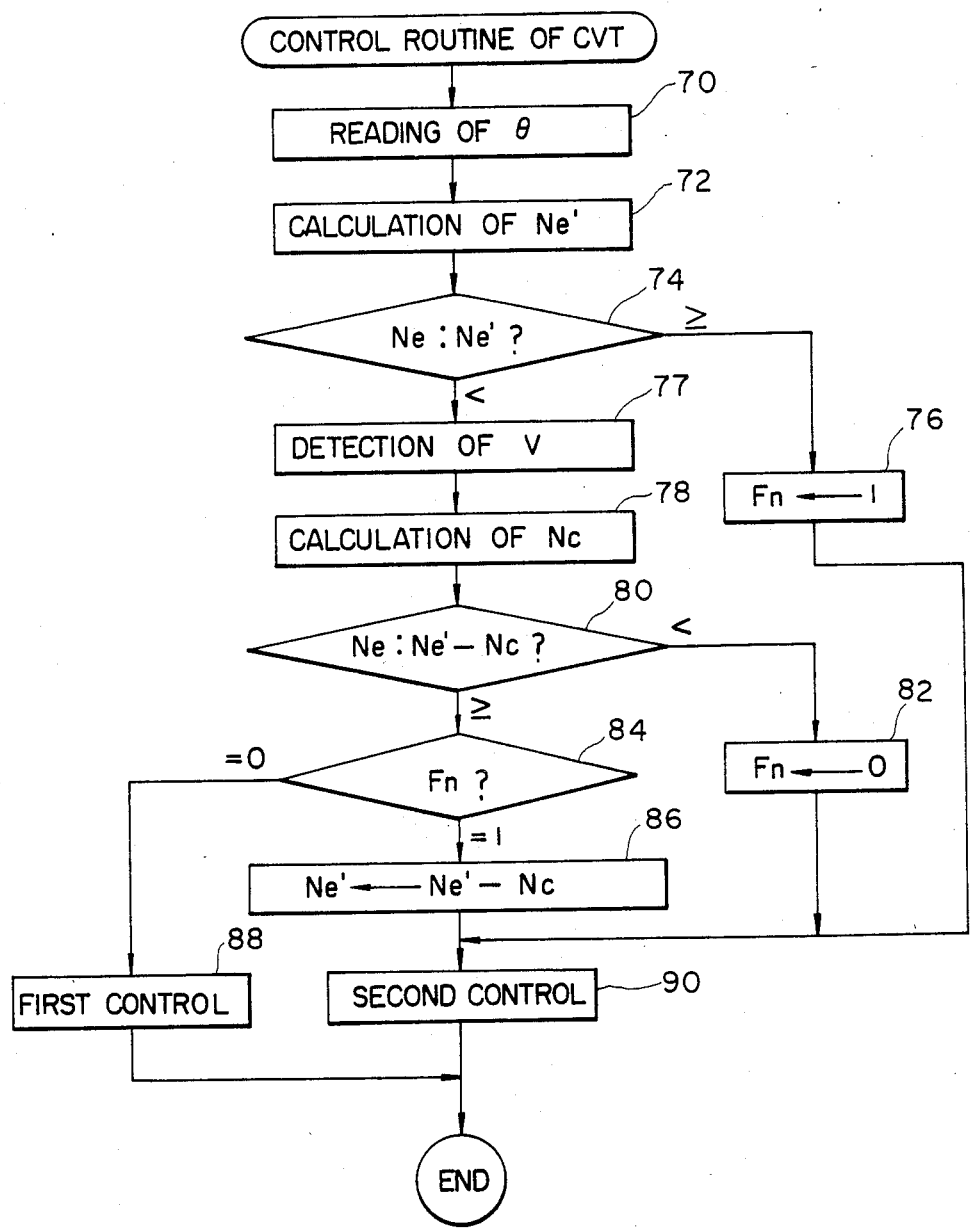
FIG. 6 is a flow chart showing a control routine of the CVT.

FIG. 6 is a flow chart showing a control routine of the CVT. When Ne<Ne'−Nc, a flag Fn is reset, and when Ne>Ne', the flag Fn is set.

As seen in step 82, a flag Fn is set to 0 with a change from Ne<Ne'−Nc to Ne'−Nc$\leq$Ne<Ne' occurs. Therefore if a condition of Ne'−Nc$\leq$Ne<Ne' occurs at Fn=0, there occurs a period of fixed speed ratio as shown in FIG. 3. Therefore, a control to fix the speed ratio 3 is performed at this time. Also, if Fn=1, if Ne$\geq$Ne' is changed to Ne'−Nc<Ne<Ne', further in other words when Ne should be decreased to Ne'−Nc, a second control for controlling the speed change (changing of speed ratio e) is performed. In other cases, i.e. when Ne<Ne'−Nc and Ne$\geq$Ne', the second control is carried out. Referring particularly to each step, in step 70 is read the throttle position $\theta$. In step 72 is calculated the desired engine speed Ne' from the throttle position $\theta$. In step 74 is compared Ne with Ne' and advance is made to step 76 if Ne$\geq$Ne' and to step 78 if Ne<Ne' respectively. In step 76 is set the flag Fn and advance is made to step 90. In step 77 is detected the vehicle speed V. In step 78 is calculated Nc from the vehicle speed V and the throttle position $\theta$. In step 80 is compared Ne with Ne'−Nc and advance is made to step 82 if Ne<Ne'−Nc and to step 84 if Ne$\geq$Ne−Nc. In step 82 is reset the flag Fn and advance is made to step 90. In step 84 is judged the value of flag Fn and advance is made to step 86 if Fn=1 and to step 88 if Fn=0. In step 86 is substituted Ne'−Nc, i.e. Net' for Ne' and advance is made to step 90. In steps 88, 90 are carried out respectively the first and second controls.

Figure 7:
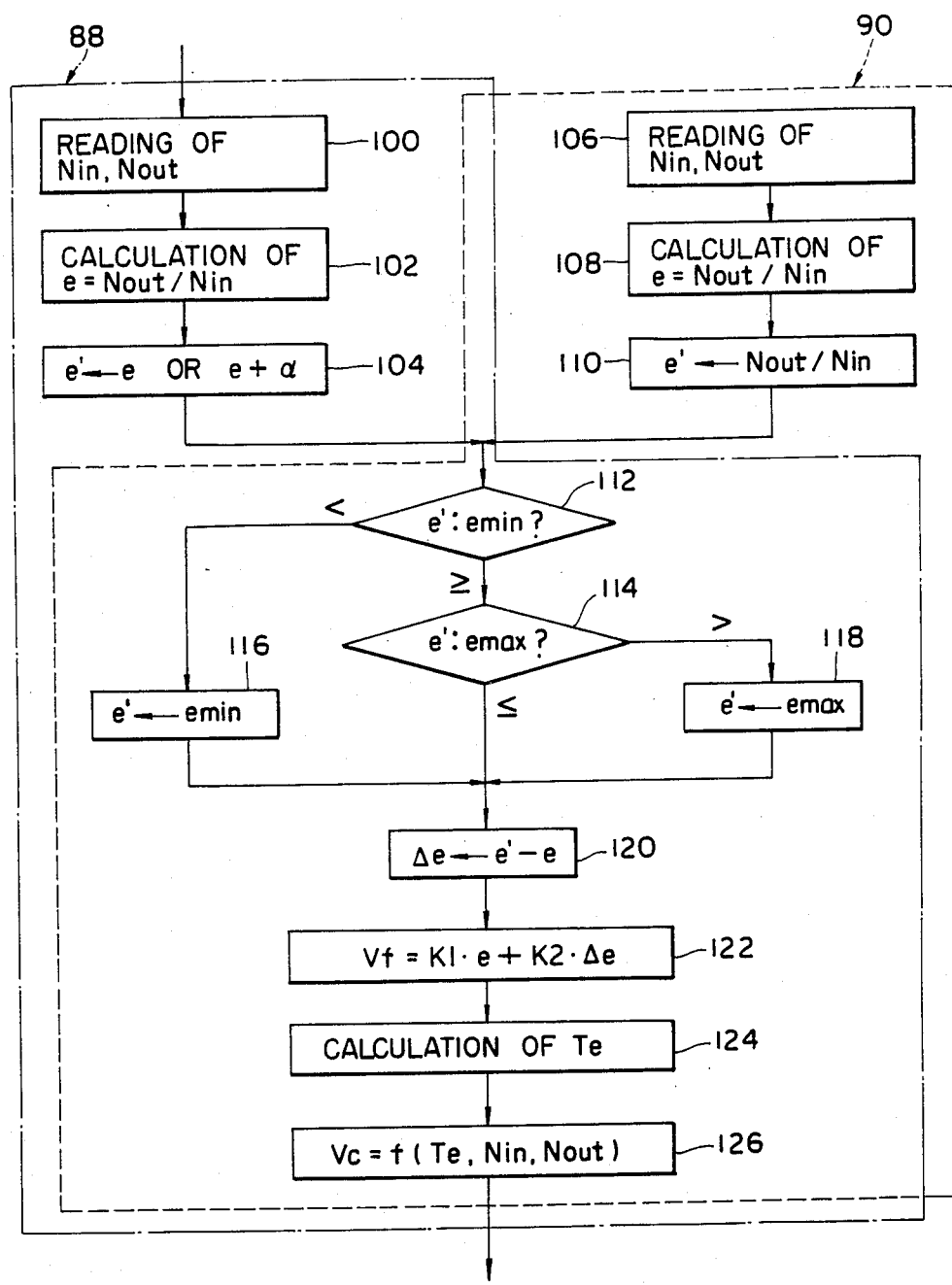
FIG. 7 is a flow chart showing first and second controls.

FIG. 7 shows the details of steps 88, 90 in FIG. 6. Step 112 and steps after same are common to the first and second controls. In the first control is detected the present speed ratio e, and e or e+$\alpha$ is substituted for the desired speed ratio e'. The changing of the speed ratio e means lessening of the transmission efficiency lower than 100%. While the larger the change amount of the speed ratio e is, the more the transmission efficiency is lessened from 100%, α is defined as a value by which the transmission efficiency is judged to be approximately 100% even if the change amount of the speed ratio e is α. In the second control, Nout/Nin' is set as the desired speed ratio e', provided Nin' is the desired input side rotational speed and Nin'=Ne'. The control voltage Vf of the flow controlling valve 38 is controlled such that an actual speed ratio e is equalized to the desired speed ratio e', and the control voltage Vc of the pressure regulating valve 32 is controlled through the engine torque Te, the input side rotational speed Nin and the output side rotational speed Nout so that the slip of the belt 26 is prevented to hold the line pressure at a necessary minimum value to ensure the torque transmission. Referring to the details of respective steps, in step 100 are read the rotational speeds Nin, Nout of the input and output shafts 12, 14. In step 102 is calculated the actual speed ratio e from the formula of e=Nout/Nin. In step 104 is substituted e or e+α for the desired speed ratio e' and advance is made to step 112. In steps 106, 108 are carried out the same processes as those in steps 100, 102 respectively. In step 110 is substituted Nout/Nin' (provided Nin'=Ne') for the desired speed ratio e' and advance is made to step 112. In steps 112–118 is set the desired speed ratio e' within the range of the lower limit emin≦e'≦the upper limit emax. In step 120 is substituted e'−e for deviation Δe. In step 122 is calculated the control voltage Vf of the flow controlling valve 38 from Vf=K1·e+K2·Δe, provided K1, K2 are constants. In step 124 is calculated the engine torque Te. The engine torque Te is calculated from the throttle position θ and the engine speed Ne. In step 126 is calculated the control voltage Vc of the pressure regulating valve 32 as a function f of Te, Nin and Nout.

Figure 8:
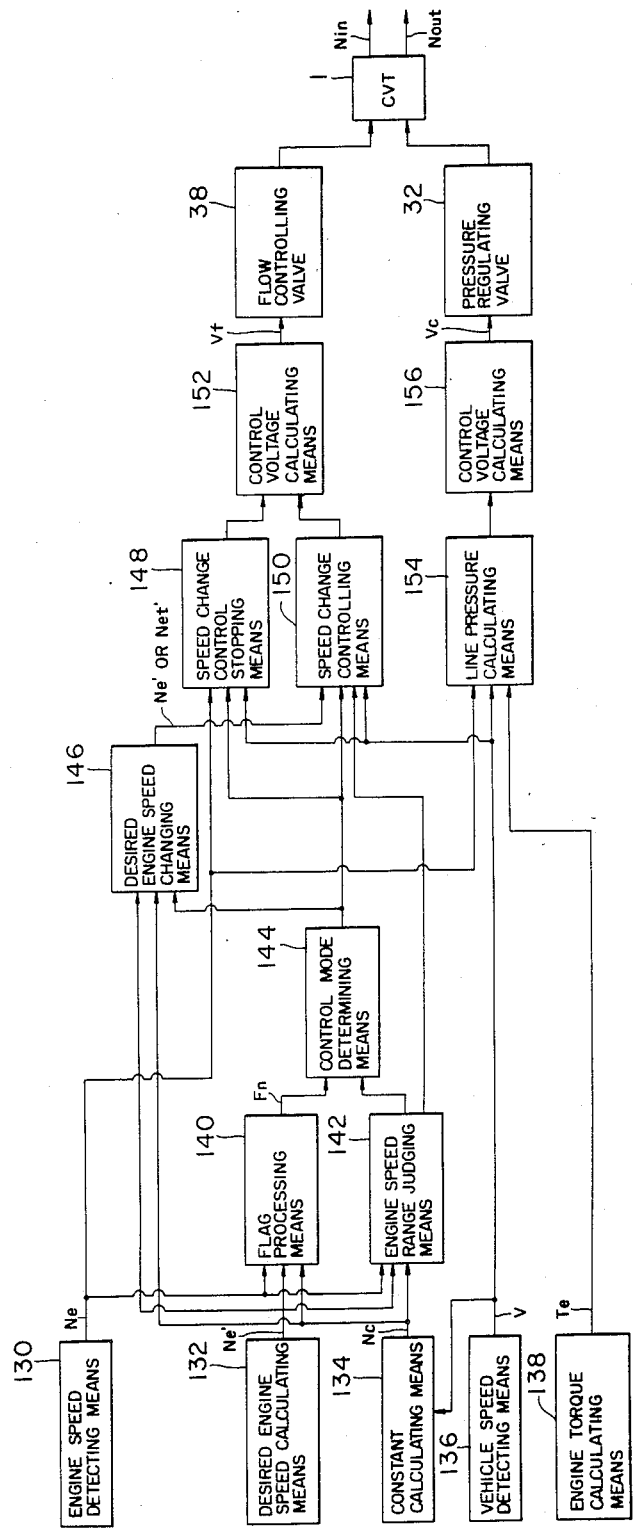
FIG. 8 is a block diagram showing the function of the present invention.

FIG. 8 is a block diagram showing the function of the present invention. An engine speed detecting means 130 detects the engine speed Ne, a desired engine speed calculating means 132 calculates the desired engine speed Ne' from the throttle position θ, a constant calculating means 134 calculates the constant value Nc from the throttle position θ and the vehicle speed V, a vehicle speed detecting means 136 detects the vehicle speed V and an engine torque calculating means 138 calculates the engine torque Te. A flag processing means 140 sets the flag Fn if Ne≧Ne' and reset it if Ne<Ne'−Nc. A control mode determining means 144 fixes the speed ratio e to the present value by a speed change control stopping means 148 when Ne'−Nc≦Ne<Ne' and Fn=0, and in the other cases, the speed ratio e is changed by a speed change controlling means 150, provided the desired engine speed is changed from Ne' to Ne'−Nc by a desired engine speed changing means 146 when Ne'−Nc≦Ne<Ne' and Fn=1. A control voltage calculating means 152 calculates the control voltage Vf sent from the speed change control stopping means 148 or the speed change controlling means 150 and corresponding to the speed ratio e and deviation Δe to drive the flow controlling valve 38 on the basis of this control voltage Vf. A line pressure calculating means 110 calculates the necessary minimum line pressure from the vehicle speed V and the engine torque Te. A control voltage calculating means 156 calculates the control voltage Vc corresponding to the line pressure to drive the pressure regulating valve 32 on the basis of this control voltage Vc.

It will be apparent to those skilled in the art that various modifications and variations may be made in the elements of the present invention without departing from the scope or spirit of the invention.

What is claimed is:

1. An apparatus for controlling a continuously variable transmission (CVT) wherein an actual engine speed Ne is equalized to a desired engine speed Ne', which is determined in accordance with at least one parameter said apparatus comprising:
   a means for providing a positive constant value to Nc,
   a means for substantially fixing the speed ratio of the CVT for a period of time starting when Ne changes from Ne<Ne'−Nc to Ne'−Nc≦Ne<Ne', and continuing until Ne≧Ne',
   a feedback control means for providing Ne'−Nc as a temporary desired engine value for a period of time starting when Ne changes from Ne≧Ne' to Ne'−Nc≦Ne<Ne', and continuing until Ne<Ne'−Nc, and
   a means for changing the speed ratio e of the CVT such that the actual engine speed Ne is equalized to the temporary engine speed Ne'−Nc during said period of time,
   wherein one of said parameters which determine the desired engine speed is the throttle position.

2. An apparatus for controlling a continuously variable transmission (CVT) as defined in claim 1, wherein the speed change of the CVT is controlled such that when Ne≧Ne', a flag Fn is set, when Ne<Ne'−Nc, the flag Fn is reset, when Ne'−Nc≦Ne<Ne' and Fn=0 the speed ratio e is approximately fixed and when Ne'−Nc≦Ne<Ne' and Fn=1 Ne'−Nc is defined as a temporary desired engine speed Net' to provide Ne=Net'.

3. An apparatus for controlling a continuously variable transmission (CVT) as defined in claim 2, wherein the constant Nc is a function of a vehicle speed V and a throttle position θ.

4. An apparatus for controlling a continuously variable transmission (CVT) as defined in claim 3, wherein Net'=Ne'−Nc.

5. A method for controlling a continuously variable transmission (CVT) wherein an actual engine speed Ne is equalized to a desired engine speed Ne', said method comprising the steps of:
   providing a positive constant value to Nc;
   substantially fixing the speed ratio of the CVT for a period of time startig when Ne changes from Ne<Ne'−Nc to Ne'−Nc≦Ne<Ne', and continuing until Ne≧Ne';
   establishing Ne'−Nc as a temporary desired engine value for a period of time starting when Ne changes from Ne≧Ne' to Ne'−Nc≦Ne<Ne', and continuing until Ne<Ne'−Nc;
   changing the speed ratio e of the CVT such that the actual engine speed Ne is equalized to the temporary engine speed Ne'−Nc during said period of time.

6. A method for controlling a continuously variable transmission (CVT) as defined in claim 5, wherein the speed change of the CVT is controlled such that when Ne≧Ne', a flag Fn is set, when Ne<Ne'−Nc, the flag Fn is reset, when Ne'−Nc≦Ne<Ne' and Fn=0 the speed ratio e is approximately fixed and when Ne'−Nc≦Ne<Ne' and Fn=1 Ne'−Nc is defined as a temporary desired engine speed Net' to provide Ne=Net'.

7. A method for controlling a continuously variable transmission (CVT) as defined in claim 6, wherein the constant Nc is a function of a vehicle speed V and a throttle position θ.

8. A method according to claim 7 for controlling a continuously variable transmission (CVT) as defined in claim 7, wherein Net'=Ne'−Nc.

* * * * *